United States Patent
Piercey et al.

[11] Patent Number: 5,951,267
[45] Date of Patent: Sep. 14, 1999

[54] DIAPHRAGM FOR SEAL-LESS INTEGRAL-MOTOR PUMP

[75] Inventors: Mark S. Piercey, Sudbury, Mass.; Frederic W. Buse, Allentown, Pa.

[73] Assignees: Ingersoll-Dresser Pump Co., Liberty Corner, N.J.; Kaman Electromagnetics Corp., Hudson, Mass.

[21] Appl. No.: 08/937,087

[22] Filed: Sep. 24, 1997

[51] Int. Cl.[6] .................................................. F04B 35/04
[52] U.S. Cl. .................................. 417/423.11; 417/423.7
[58] Field of Search ........................... 417/423.7, 423.11

[56] References Cited

U.S. PATENT DOCUMENTS

| | | | |
|---|---|---|---|
| 3,667,870 | 6/1972 | Yoshida et al. | 417/357 |
| 4,013,384 | 3/1977 | Oikawa | 417/368 |
| 4,684,329 | 8/1987 | Hashimoto | 417/357 |
| 4,728,268 | 3/1988 | Laing | 417/420 |
| 4,890,988 | 1/1990 | Kramer et al. | 417/372 |
| 5,017,103 | 5/1991 | Dahl | 417/420 |
| 5,129,795 | 7/1992 | Hyland | 417/423.12 |
| 5,144,177 | 9/1992 | Rupprecht | 310/86 |
| 5,393,207 | 2/1995 | Maher et al. | 417/423.7 |
| 5,397,220 | 3/1995 | Akihisa et al. | 417/369 |

*Primary Examiner*—Timothy S. Thorpe
*Assistant Examiner*—Ehud Gartenberg
*Attorney, Agent, or Firm*—Robert F. Palermo

[57] ABSTRACT

A diaphragm system is provided for isolating a motor stator from pumped fluid in a seal-less integral-motor pump, the pump having a non-rotating shaft fixed to a motor housing containing the motor stator, the shaft extending into a pump casing within which an impeller is integrated with a motor rotor. The diaphragm system includes a non-metallic diaphragm having a periphery, which conforms to and is clamped between mating surfaces of the housing and the pump casing, and a central circular hole, which surrounds the shaft and is clamped thereby against the housing. Clamping pressure on the diaphragm is limited, and static and dynamic bearing forces are passed directly from the shaft to the housing to minimize creep distortion of the diaphragm which could cause early failure of the pump.

7 Claims, 3 Drawing Sheets

5,951,267

DIAPHRAGM FOR SEAL-LESS INTEGRAL-MOTOR PUMP

BACKGROUND OF THE INVENTION

This invention relates generally to seal-less integral-motor fluid pumps and more particularly to an improved diaphragm for physically isolating the motor stator from the motor rotor and the pumped fluid.

A seal-less pump which has the motor rotor integrated into the impeller and the stationary windings of the stator isolated from the pumped fluid requires a diaphragm to accomplish such isolation of the stator. The diaphragm must be non-metallic in most designs to minimize eddy current losses and to permit efficient electromagnetic coupling of the rotor and stator. Since the pumped fluid may be a corrosive or otherwise dangerous chemical, and since the diaphragm is exposed to the pump discharge pressure, the diaphragm must be constrained to prevent rupture or blow-out. Diaphragms are commonly clamped between housing members of the pump, and, non-metallics being of low elastic modulus, are subject to distortion due to creep induced by the constant high clamping force. The diaphragm is weakened by the reduction of thickness, and it ultimately fails. Such failures can be very costly, since the applications for seal-less pumps are usually for handling dangerous and chemically aggressive fluids.

The foregoing illustrates limitations known to exist in present diaphragms in seal-less integral motor pumps, and it would be advantageous to provide an alternative directed to overcoming one or more of those limitations. Accordingly, a suitable alternative is provided including features more fully disclosed hereinafter.

SUMMARY OF THE INVENTION

In one aspect of the present invention, a diaphragm system is provided for isolating a motor stator from pumped fluid in a seal-less integral-motor pump having a non-rotatable shaft fixed to a motor housing containing the motor stator, the shaft extending into a pump casing within which an impeller is integrated with a motor rotor. The diaphragm system comprises a non-metallic membrane having a periphery, which conforms to and is clamped between mating surfaces of the housing and the pump casing, and a central circular hole, which surrounds the shaft and is clamped thereby against the housing using limited clamping pressure on the membrane.

The foregoing and other aspects of the invention will become apparent from the following detailed description, when considered in conjunction with the accompanying drawings.

DETAILED DESCRIPTION

Figure 1:
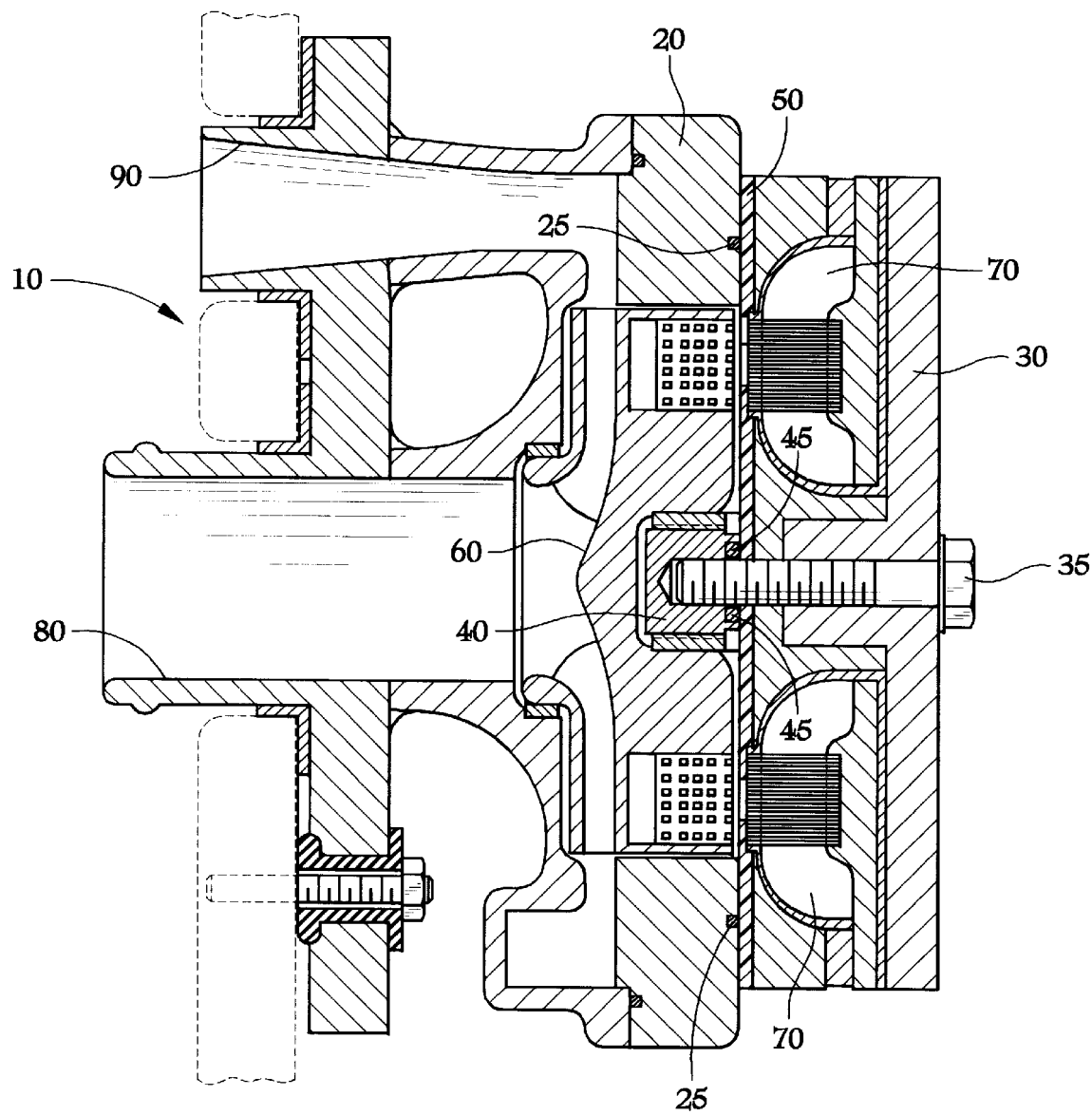
FIG. 1 is a longitudinal cross-sectional view illustrating a seal-less integral motor pump incorporating a diaphragm of the prior art.

The seal-less integral-rotor pump 10 of FIG. 1 shows a diaphragm system of the prior art. The pump 10 consists of a pump casing 20 having an inlet 80 and a discharge 90 and contains a rotor/impeller 60, which may be made by attaching an impeller to a motor rotor or by integrally forming the rotor in the impeller. A non-rotatable shaft 40 rotatably supports the rotor/impeller 60 in axial and radial directions and is bolted or otherwise fastened to the motor housing 30, which houses a motor stator 70 and which is fastened to the pump casing 20. A diaphragm 50 has its outer edge interposed between the pump casing 20 and the motor housing 30 and its inner edge clamped between the shaft 40 and the housing 30. This isolates the motor stator 70 from the pumped fluid. The clamping force of the shaft is provided either by the external fastener 35 or by otherwise threading the shaft 40 and the motor housing 30 together. An "o" ring seal 45 in a groove surrounds the shaft 40 and abuts the inner edge of the diaphragm 50 and another "o" ring seal 25 in a groove on the pump casing 20 abuts the outer edge. As can be seen in FIG. 1, the shaft 40 is clamped against the diaphragm 50 which acts as a soft washer and diminishes the rigidity of the shaft mounting. As a result, the radial and axial hydraulic forces and vibrations of the impeller are transmitted by the shaft 40 through the diaphragm 50 to the housing 30, and the diaphragm life is shortened due to creep distortion induced by the resulting stresses imposed on the diaphragm.

Figure 2:
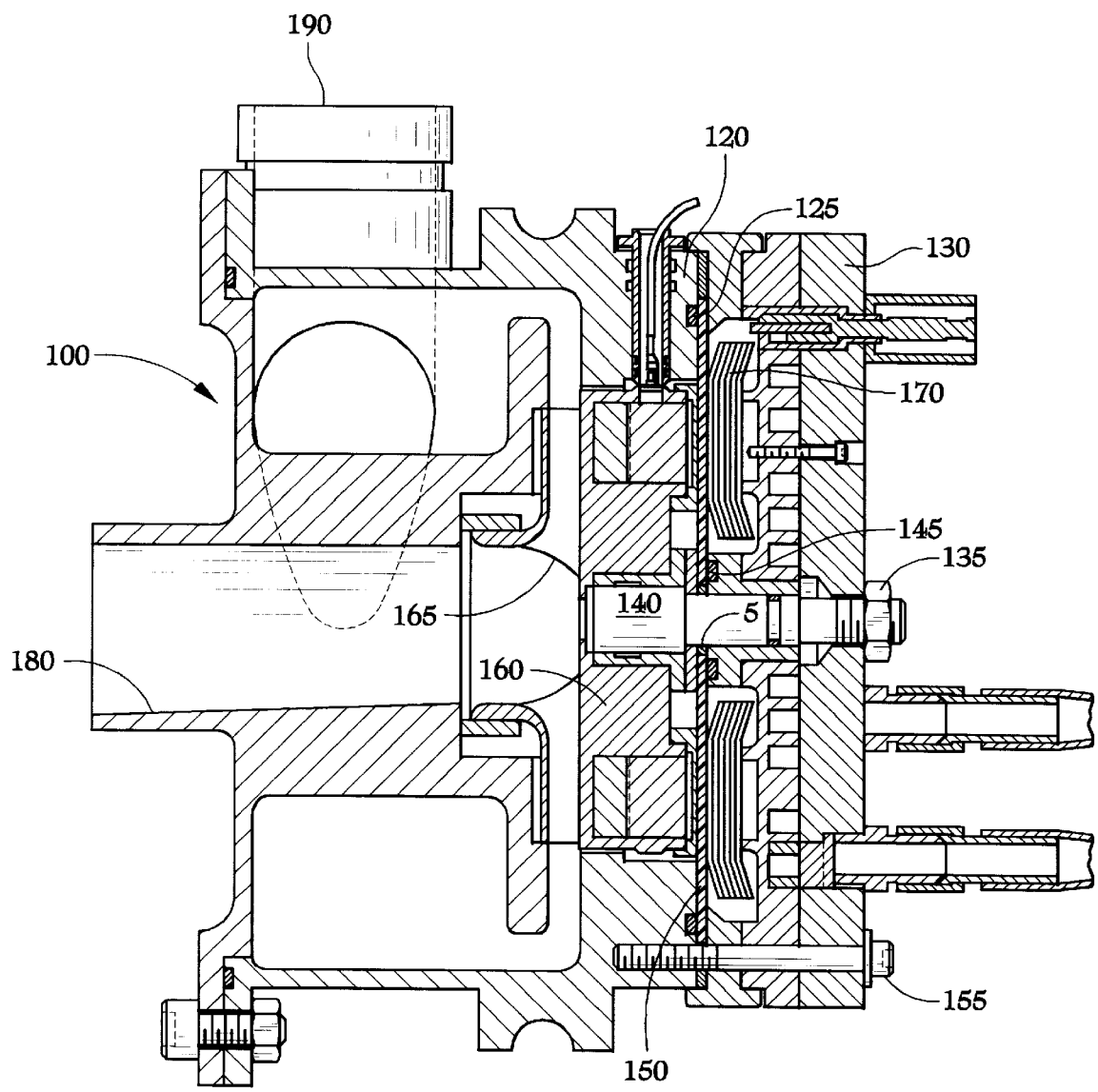
FIG. 2 is a longitudinal cross-sectional view illustrating an embodiment of the invention incorporated in a seal-less integral motor centrifugal.
Figure 3:
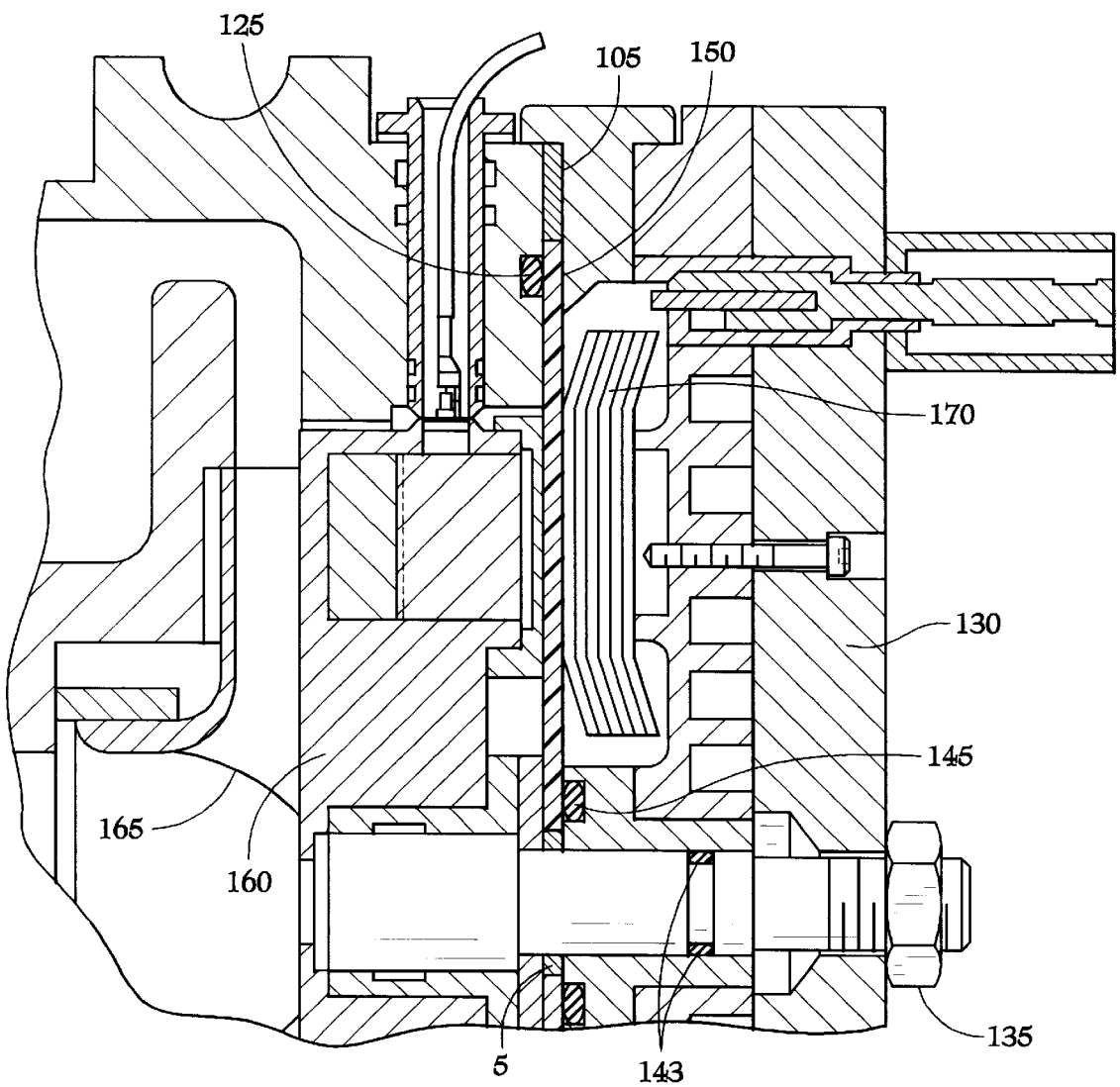
FIG. 3 is a fragmentary longitudinal cross-sectional view showing greater detail of the invention.

The improved diaphragm system of the invention is seen in FIGS. 2 and 3, in which a pump 100 comprises a pump casing 120 in which an inlet 180 and a discharge 190 are in fluid communication with impeller vanes 165 of a rotor/impeller 160. A motor housing 130 contains a motor stator 170 and is fastened to the pump casing 120 by fasteners 155. A non-rotatable shaft 140 is rigidly fastened to the housing by a fastener 135, or by threading directly together with the pump casing, and radially and axially supports the rotor/impeller 160. An "o" ring 143 provides a static seal between the shaft 140 and the housing 130. The diaphragm 150 is clamped, at its outer edge, between the housing 130 and the pump casing 120 and, at its inner edge, between the housing 130 and the shaft 140. A rigid outer spacer 105 which has an outer diameter slightly less than that of the motor housing 130, an inner diameter slightly greater than the outer diameter of the diaphragm membrane 150, and a thickness approximately equal to that of the diaphragm membrane 150 is clamped, along with the diaphragm, between the housing and the pump casing. Another rigid spacer 5 having an outer diameter slightly less than the inner diameter of the diaphragm membrane, an inner diameter slightly greater than the diameter of the shaft 140, and a thickness approximately equal to that of the diaphragm membrane 150 is clamped with the diaphragm membrane between the shaft 140 and the housing 130. In an alternative embodiment, the rigid spacer rings 5, 105 may be integrally formed on the shaft and/or the motor housing. Grooves in the face of the pump case outer face and the housing inner face support "o" rings 125 and 145, respectively, to press against the diaphragm membrane 150 to form a seal against and to hold the diaphragm membrane in place under discharge pressure of the pumped fluid.

Thus, the diaphragm system of the invention consists of a thin non-metallic diaphragm membrane 150, a rigid integral or separable inner spacer ring 5, a rigid integral or separable outer spacer ring 105, an inner "o" ring 145, and an outer "o" ring 125. The inner and outer spacers 5, 105 are preferably of the same thickness as the diaphragm membrane 150, such that the diaphragm membrane is firmly held by, but not thinned by, the clamping forces between the pump casing 120, the housing 130 and the shaft 140. The only compressive forces on the diaphragm membrane 150 are due to the "o" rings 125, 145 which elastically deform against the diaphragm membrane to form seals and do not cause creep distortion of the diaphragm membrane. Early diaphragm failures due to local thinning are thus avoided. The inner and outer separable spacers are preferably made of steel or other metal compatible with the pump materials for the application.

Finally, since inner spacer 5 is interposed, along with the diaphragm membrane 150, between the shaft 140 and the housing 130, the bearing loads are transmitted through the shaft 140 and the spacer 5 directly to the housing 130. This avoids the diaphragm deterioration attributable to the prior art designs.

Having described the invention, we claim:

1. A diaphragm system for isolating a motor stator from pumped fluid in a seal-less integral-motor pump, said pump having a non-rotatable shaft fixed to motor housing containing said motor stator, said shaft extending into a pump casing within which an impeller is integrated with a motor rotor, said diaphragm system comprising:

a non-metallic diaphragm having an outer periphery, which conforms to and is clamped between mating surfaces of said housing and said pump casing, and a central circular hole, which surrounds said shaft and is clamped thereby against said housing; and spacer means for limiting clamping pressure on said diaphragm;

O-ring means for sealing said diaphragm against said housing and said casing respectively.

2. The diaphragm system of claim 1, wherein said spacer means for limiting clamping pressure on said diaphragm comprises an inner spacer ring having a thickness approximately equal to that of said diaphragm, an outer diameter less than that of said central circular hole, and an inner diameter greater than the diameter of the shaft, said inner spacer ring being clamped with said diaphragm between said shaft and said housing.

3. The diaphragm system of claim 2, wherein said spacer means further comprises:

an outer spacer ring having a thickness approximately equal to that of said diaphragm, an outer diameter less than that of said housing, and an inner diameter greater than the outer diameter of the diaphragm, said outer spacer ring being clamped with said diaphragm between said pump casing and said housing.

4. The diaphragm system of claim 3, wherein said o-ring means comprises:

an o-ring seal between said pump casing and said diaphragm adjacent said outer spacer ring; and an o-ring seal between said diaphragm and one of said shaft or said housing adjacent said inner spacer ring.

5. The diaphragm system of claim 2, wherein the inner spacer ring comprises a shoulder integrally formed on one of said motor housing or said shaft.

6. The diaphragm system of claim 3, wherein the outer spacer ring comprises a shoulder integrally formed on one of said motor housing or said pump casing.

7. The diaphragm system of claim 6, wherein said o-ring means comprises:

an o-ring seal between said pump casing and said diaphragm adjacent said outer spacer ring; and an o-ring seal between said diaphragm and one of said shaft or said housing adjacent said inner spacer ring.

* * * * *